(12) United States Patent
Kim et al.

(10) Patent No.: US 7,495,065 B2
(45) Date of Patent: Feb. 24, 2009

(54) METHOD OF PREPARING POLYCARBONATE RESIN

(75) Inventors: Jong Hun Kim, Daejeon (KR); Boo Gon Woo, Daejeon (KR); Sung Kyou Park, Busan (KR); Mijeung Hong, Daejeon (KR)

(73) Assignee: LG Chem, Ltd. (KR)

( * ) Notice: Subject to any disclaimer, the term of this patent is extended or adjusted under 35 U.S.C. 154(b) by 266 days.

(21) Appl. No.: 11/368,568

(22) Filed: Mar. 6, 2006

(65) Prior Publication Data

US 2006/0199940 A1  Sep. 7, 2006

(30) Foreign Application Priority Data

Mar. 7, 2005 (KR) .................... 10-2005-0018844

(51) Int. Cl.
*C08G 64/00* (2006.01)
*C08G 63/02* (2006.01)

(52) U.S. Cl. .................. 528/198; 528/196; 528/199

(58) Field of Classification Search .......... 528/196, 528/198, 199
See application file for complete search history.

(56) References Cited

U.S. PATENT DOCUMENTS

| | | | |
|---|---|---|---|
| 4,269,964 A | 5/1981 | Freitag et al. | |
| 5,034,496 A | 7/1991 | Bales et al. | |
| 5,276,129 A * | 1/1994 | Sakashita et al. | 528/198 |
| 5,321,114 A | 6/1994 | Fontana et al. | |
| 6,500,914 B1 * | 12/2002 | Brack et al. | 528/196 |
| 6,620,902 B2 | 9/2003 | Shimoda et al. | 528/196 |

FOREIGN PATENT DOCUMENTS

| | | |
|---|---|---|
| JP | 64-056728 | 3/1989 |
| JP | 2003-226747 | 8/2003 |

OTHER PUBLICATIONS

Korean Intellectual Property Office, PCT International Search Report, Date of Mailing: Jun. 20, 2006.

* cited by examiner

*Primary Examiner*—Terressa M Boykin
(74) *Attorney, Agent, or Firm*—Lerner, David, Littenberg, Krumholz & Mentlik, LLP

(57) ABSTRACT

A method of preparing a polycarbonate resin having improved thermal stability is provided. The method includes: mixing polycarbonate having hydroxy terminal groups and a end terminator, a compound of formula (1) (refer to the detailed description section) at normal temperature and pressure to obtain a mixture; and performing a melt reaction on the mixture at 250-320° C. and reduced pressure to highly reduce the final concentration of the hydroxy terminal groups of the polycarbonate resin.

16 Claims, 1 Drawing Sheet

METHOD OF PREPARING POLYCARBONATE RESIN

CROSS-REFERENCE TO RELATED PATENT APPLICATIONS

This application claims the benefit of Korean Patent Application No. 10-2005-0018844, filed on Mar. 7, 2005, in the Korean Intellectual Property Office, the disclosure of which is incorporated herein in its entirety by reference.

BACKGROUND OF THE INVENTION

1. Field of the Invention

The present invention relates to a method of preparing a polycarbonate resin, and more particularly, to a method of enhancing the thermal stability of polycarbonate by removing the reactivity of a hydroxyl group, which is a polycarbonate terminal group, by reacting the terminal group with an end terminator.

2. Description of the Related Art

A polycarbonate is obtained through the condensation reaction between an aromatic dihydroxy compound, which is a main source material, and phosgene or an aromatic carbonate compound. However, when the reactivity of its terminal group is not removed during preparation of a polycarbonate resin or at the last stage of the preparation, physical-property degradation and discoloration occur due to a molecular weight reduction when the polycarbonate resin is processed at a high temperature.

There is a conventional method of adding low-molecular weight alkylphenol during preparation of polycarbonate resin to improve the thermal stability of the resin. U.S. Pat. No. 4,269,964 discloses a method of reacting the reactive group of growth chain terminals of polycarbonate with alkylphenol acting as an end terminator during interfacial polymerization involved in the preparation of polycarbonate to improve thermal stability against, for example, hydrolysis occurring when polycarbonate contacts high-temperature moisture. However, when this method is used in a non-phosgene process in high-temperature, low-pressure reaction conditions, since the boiling point of alkylphenol used as an end terminator is very low at the reaction conditions, a large amount of alkylphenol is removed through vaporization. Therefore, a larger amount of the end terminator than required to remove the reactivity of the terminal group has to be used, and the vaporized unreacted alkylphenol has to be recovered.

In U.S. Pat. No. 6,620,902, the reactivity of polycarbonate terminal groups is removed by adding a low-molecular weight aromatic hydroxy compound during a post-high temperature process. This reaction is performed under a pressure to prevent vaporization of the low-molecular weight aromatic hydroxy compound. However, although the vaporization of the low-molecular weight aromatic hydroxy compound can be reduced to some extent when the reaction is performed under a pressure, it is not easy to remove the reaction byproducts, thereby making it difficult to remove the reactivity of the terminal groups.

U.S. Pat. No. 6,500,914 discloses a method of removing the reactivity of polycarbonate terminal groups using a high-boiling point aromatic carbonate compound as an end terminator. It is very easy to remove the reactivity of the polycarbonate terminal groups because the used end terminator does not vaporize at high-temperature, reduced pressure conditions. However, a process of synthesizing the used end terminator is very dangerous because phosgene is used as a raw material, and thus the production cost increase. In addition, the end terminator costs high.

Therefore, there is a need for a method of effectively removing the reactivity of polycarbonate resin terminal groups even under high-temperature and reduced pressure conditions using a relatively cheaper, easy-to-prepare end terminator to improve the thermal stability of the polycarbonate resin.

SUMMARY OF THE INVENTION

The present invention provides a method of preparing a polycarbonate resin having improved thermal stability using a low-cost, easy-to-synthesize end terminator, wherein the chemical structure of the end terminator is very similar to the chemical structure of polycarbonate, and thus the original physical properties of the polycarbonate resin can be maintained.

The present invention provides a polycarbonate resin prepared using the above-described method.

According to an aspect of the present invention, there is provided a method of preparing a end-capped polycarbonate resin, the method comprising: mixing polycarbonate having hydroxy terminal groups and a compound of formula (1) below at normal temperature and pressure to obtain a mixture of them; and performing a melt reaction on the mixture at 250-320° C. and reduced pressure to reduce the final concentration of hydroxy terminal groups of the polycarbonate resin:

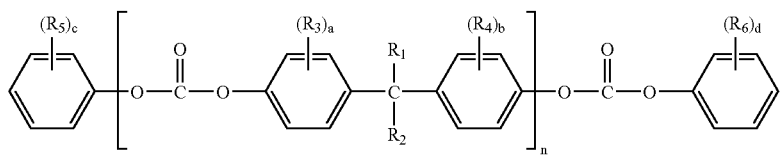

wherein n=1 to 10; each of $R_1$, $R_2$, $R_3$, $R_4$, $R_5$, and $R_6$ is independently selected from among hydrogen, a halogen atom, an alkyl group having 1-18 carbon atoms, an alkoxy group having 1-18 carbon atoms, an aryl group having 6-18 carbon atoms, an araryl group having 7-18 carbon atoms, and an aralkoxy group having 7-18 carbon atoms; a and b are integers from 0 to 4, and c and d are integers from 0 to 5.

The melt reaction is performed at a reduced pressure of 5-500 mmHg.

The amount of the compound of said formula (1) may be in a range of 0.5-20 moles with respect to 1 mole of the polycarbonate.

The final concentration of hydroxy terminal groups of the polycarbonate resin may be in a range of 0-25.0 mol % of the total terminal groups of the polycarbonate resin.

According to another aspect of the present invention, there is provided a polycarbonate resin prepared using the above-described method.

The final concentration of hydroxy terminal groups of the polycarbonate resin may be in a range of 0-25.0 mol % of the total terminal groups of the polycarbonate resin.

BRIEF DESCRIPTION OF THE DRAWING

The above and other features and advantages of the present invention will become more apparent by describing in detail exemplary embodiments thereof with reference to the attached drawing in which.

DETAILED DESCRIPTION OF THE INVENTION

Figure 1:
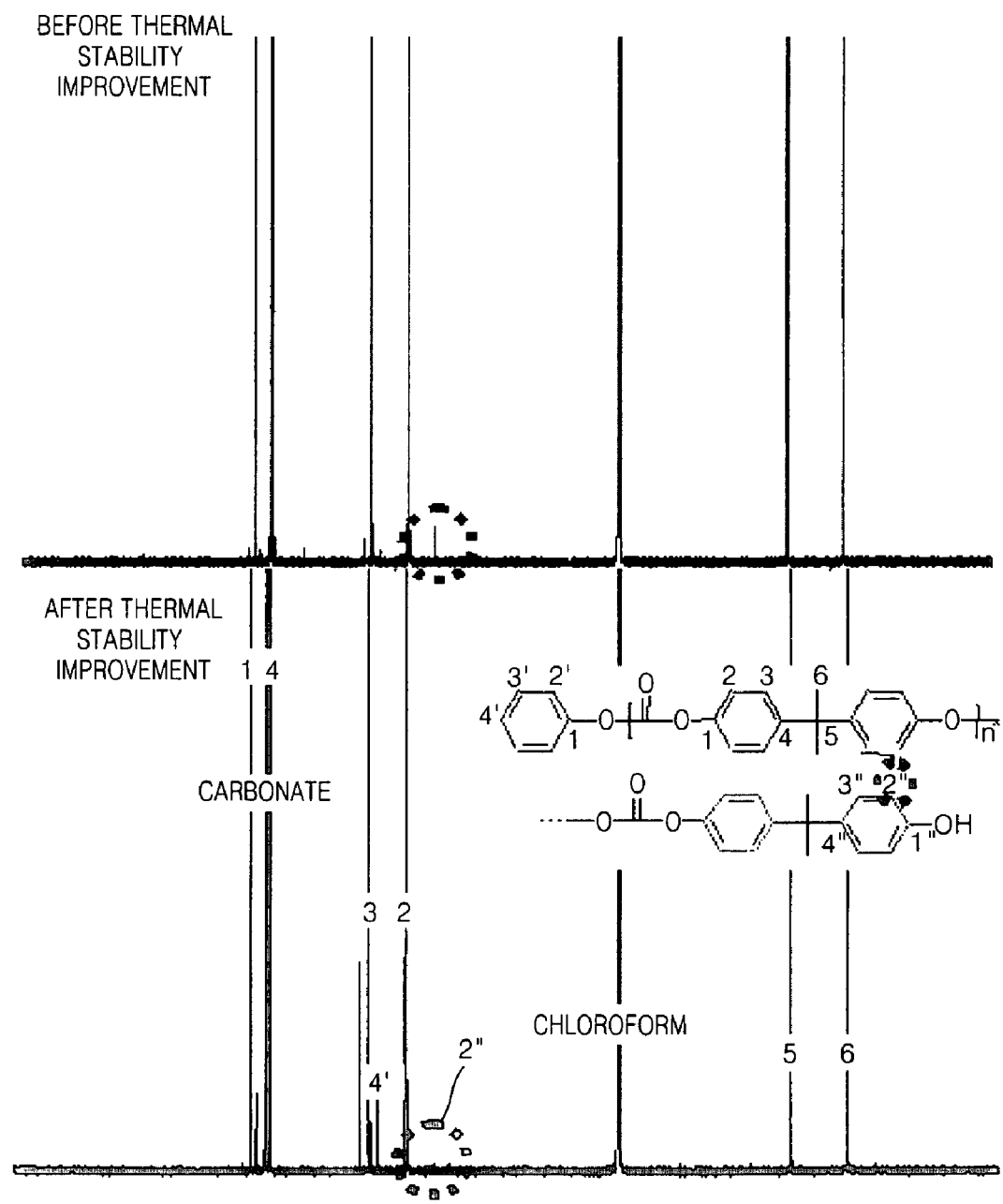
FIG. 1 is $^{13}$C-NMR charts showing changes in peak height according to the composition of terminal —OH groups before and after the improvement of thermal stability of polycarbonate resin according to the present invention.

Hereinafter, the present invention will be described in detail with reference to the appended drawings.

A polycarbonate resin having improved thermal stability according to the present invention can be used using a dialkyl (aryl)carbonate and an aromatic hydroxy compound by any method, such as interfacial polymerization, melt polymerization, solid-state polymerization, etc.

Examples of the dialkyl(aryl)carbonate include diphenyl-carbonate, bis-chlorophenyl-carbonate, m-cresyl carbonate, dinaphthyl carbonate, dimethyl carbonate, dicyclohexyl carbonate, a mixture thereof, etc.

Examples of the aromatic hydroxy compound include bis (4-hydroxy phenyl)-methane, 2,2-bis(4-hydroxyphenyl)-propane, 2,2-bis(4-hydroxy-3,5-dibromophenyl)-propane, 1,4-dihydroxy-3-methyl-benzene, bis(4-hydroxy phenyl)sulfide, a mixture thereof, etc.

The polycarbonate resin having improved thermal stability according to the present invention may have any molecular weight and any shape, for example, powder form, pellet form, etc. However, 25.1 mol % or more of the terminal groups of the polycarbonate resin consist of hydroxy groups.

In the present invention, a compound having a chemical structure of formula (1) below including the same repeating units as the polycarbonate resin is used as an end terminator.

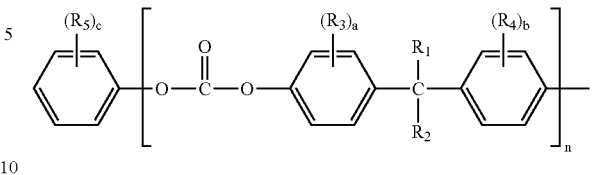

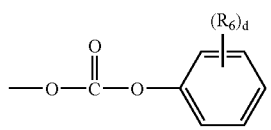

where n=1 to 10; each of $R_1$, $R_2$, $R_3$, $R_4$, $R_5$, and $R_6$ is independently selected from among hydrogen, a halogen atom, an alkyl group having 1-18 carbon atoms, an alkoxy group having 1-18 carbon atoms, an aryl group having 6-18 aryl groups, an araryl group having 7-18 carbon atoms, and an aralkoxy group having 7-18 carbon atoms; a and b are integers from 0 to 4, and c and d are integers from 0 to 5.

The compound of formula (1) above is prepared by reacting raw materials, such as an aromatic dihydroxy compound, aromatic carbonate, etc., in a melt state at a temperature of 100-300° C., preferably, 150-270° C., and reduced pressure for 30 minutes to 1 hour. If the reaction temperature is lower than 100° C., the reaction cannot proceed. If the reaction temperature is higher than 300° C., the synthesized end terminator thermally decomposes. If the reaction time is shorter than 30 minutes, the reaction cannot sufficiently proceed. If the reaction time exceeds 1 hour, the end terminator has too large molecular weight.

The reaction pressure may be in a range of 5-500 mmHg, preferably, 100-300 mmHg. If the pressure is smaller than 5 mmHg, the raw materials vaporize. If the pressure exceeds 500 mmHg, phenol generated as a reaction by-product remains and causes discoloration, and the reaction cannot proceed sufficiently.

After the end terminator having the chemical structure of formula (1) and the polycarbonate resin having hydroxy terminal groups are well mixed in a solid state at normal temperature and pressure, the mixture is reacted in a melt state at a temperature of 200-350° C., preferably, 250-320° C., and reduced pressure for 20 minutes to 1 hour. If the reaction temperature is lower than 200° C., the reaction proceeds too slowly. If the reaction temperature is higher than 350° C., thermal decomposition occurs during the reaction. If the reaction time is shorter than 20 minutes, the reaction cannot sufficiently proceed. If the reaction time is longer than 1 hour, the molecular weight of the polycarbonate excessively increases.

The reaction pressure may be in a range of 0.1-500 mmHg, preferably, 5-100 mmHg. If the pressure exceeds 500 mmHg, there is a likelihood that phenol, which is a reaction by-product, remains. If the pressure exceeds 500 mmHg, it is not easy to remove reaction by-products and lower the concentration of terminal hydroxy groups.

If the reaction temperature is lower than 200° C., the melting is imperfect. If the reaction temperature is higher than 350° C., the produced polycarbonate resin thermally decomposes and thus has a smaller molecular weight and undergoes a deterioration in physical properties.

The end terminator, the compound of formula (1) can reduce the concentration of terminal hydroxy groups of polycarbonate resin through the transesterification of the terminal carbonate groups of them and the terminal hydroxy groups of the polycarbonate resins. The final concentration of terminal hydroxy groups may be in a range of 0-25mol %, preferably, 0-15mol %, of the total terminal groups. If the final concentration of terminal hydroxy groups is greater than 25.0 mol %, an improvement in thermal stability is negligible.

Examples of a reactor that can be used include a vented single- or twin-screw extruder, and a thin film reactor or evaporator, etc. When the melt viscosity of reaction compounds is low, a general tank reactor can be used.

Hereinafter, the present invention will be described in more detail with reference to the following examples. The following examples are only for illustrative purposes and are not intended to limit the scope of the present invention.

SYNTHESIS EXAMPLE

To synthesize an end terminator of formula (2) below, 22.4 g of diphenyl carbonate, 18.2 g of bisphenol A, and 0.0001 mol % of sodium acetate with respect to the concentration of bisphenol A were put into a 100-mL glass reactor and reacted at 250° C. for 1 hour while stirring. The internal pressure of the reactor was 250 mmHg. After the completion of the reaction, the temperature was lowered to room temperature, and 100 mL of methylene chloride was added to completely dissolve the reaction product. 100 mL of methanol was added to obtain precipitates. The precipitates were filtered using a filter paper and dried to obtain an end terminator in powder form. It was confirmed through NMR analysis that the end terminator of formula (2) was successfully synthesized.

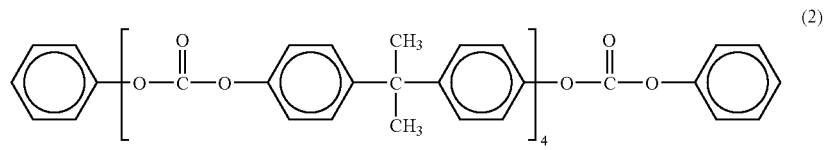

(2)

EXAMPLE

A polycarbonate in powder having a number average molecular weight of 15,930 g/mol prepared through melt polymerization and solid-state polymerization, and 1.09 g of the end terminator of formula (2), the end terminator prepared in Synthesis Example, were mixed in solid state and injected into a mold-type reactor set at 280° C.

After the mold of the reactor was sealed, the reaction was initiated while mixing the reactants using an impeller. The internal pressure of the mold was maintained at 50 mmHg. After 1 hour passed, the pressure was return to normal. The resulting polycarbonate resin in a melt state was cooled to obtain a polycarbonate resin having improved thermal stability in a solid state.

The composition of terminal groups of the polycarbonate resin was analysed using NMR. 74 mol % of the total terminal groups was hydroxy groups before the reaction. However, the percentage of hydroxy groups was reduced to 4.7 mol % after the reaction. As a result of a thermal stability test in an oven at 300° C. at normal pressure, the sample that did not undergo the thermal stability improvement became discolored after 10 minutes passed. However, the sample reacted with the end terminator did not become discolored even after 30 minutes passed. As a result of observing a molecular weight change in an oven at 280° C. and normal pressure, the molecular weight of the sample that did not undergo the thermal stability improvement was reduced by 3.8%, while the molecular weight of the sample reacted with the end terminator was reduced by only 0.8%.

As described above, the end terminator in this invention is far cheaper and can be more easily synthesized than an end terminator used in the conventional methods for the improvement of thermal stability, so that the thermal stability of polycarbonate resin can be markedly improved at a low cost. In addition, since the chemical structure of the end terminator is almost same as the chemical structure of polycarbonate, the physical properties of the polycarbonate resin can be maintained as before the thermal stability is improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of preparing an end-capped polycarbonate resin comprising: mixing a polycarbonate having hydroxy terminal groups and a compound of formula (1)

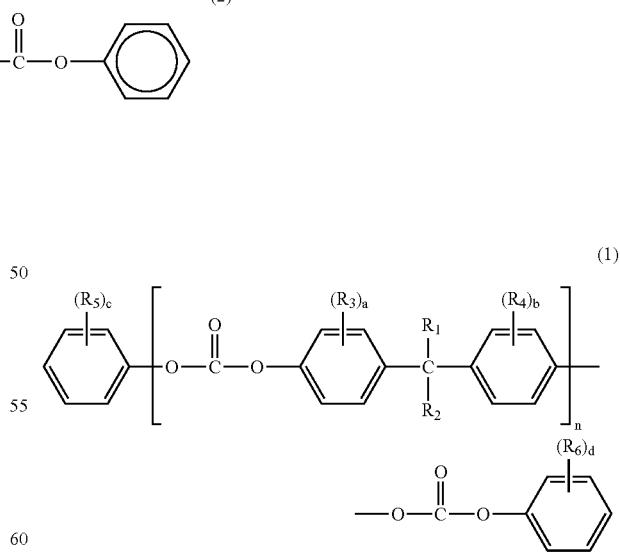

(1)

wherein n=1 to 10; each of $R_1$, $R_2$, $R_3$, $R_4$, $R_5$, and $R_6$ is independently selected from hydrogen, a halogen atom, an alkyl group having 1-18 carbon atoms, an alkoxy group having 1-18 carbon atoms, an aryl group having 6-18 carbon atoms, an araryl group having 7-18 carbon atoms, or an aralkoxy group having 7-18 carbon atoms; a and b are integers from 0 to 4, and c and d are integers from 0 to 5, at normal temperature and pressure to obtain a mixture; and melt reacting the mixture at 250-320° C. and reduced pressure of 0.1 to 500 mmHg to reduce the final concentration of the hydroxy terminal groups of the polycarbonate resin.

2. The method of claim 1, wherein the step of melt reacting is performed at a reduced pressure of 5-500 mmHg.

3. The method of claim 1, wherein the amount of said compound of formula (1) is in the range of 0.5-20 moles with respect to 1 mole of said polycarbonate.

4. The method of claim 1, wherein the final concentration of said hydroxy terminal groups of said polycarbonate resin is in the range of 0-4.7 mol % of the total terminal groups of said polycarbonate resin.

5. A polycarbonate resin prepared using the method of claim 1.

6. The polycarbonate resin of claim 5, wherein the final concentration of said hydroxy terminal groups of said polycarbonate resin is in the range of 0-4.7 mol % of the total terminal groups of said polycarbonate resin.

7. A mixed resin comprising a polycarbonate having hydroxy terminal groups and a compound of formula (1)

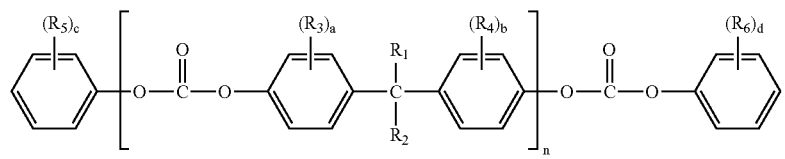

wherein n=1 to 10; each of $R_1$, $R_2$, $R_3$, $R_4$, $R_5$, and $R_6$ is independently selected from hydrogen, a halogen atom, an alkyl group having 1-18 carbon atoms, an alkoxy group having 1-18 carbon atoms, an aryl group having 6-18 carbon atoms, an araryl group having 7-18 carbon atoms, or an aralkoxy group having 7-18 carbon atoms; a and b are integers from 0 to 4, and c and d are integers from 0 to 5.

8. The mixed resin of claim 7, wherein the amount of said compound of formula (1) is in the range of 0.5-20 moles with respect to 1 mole of said polycarbonate.

9. The mixed resin of claim 7, wherein the final concentration of said hydroxy terminal groups of said polycarbonate resin is in the range of 0-4.7 mol % of the total terminal group of said mixed resin.

10. An end-capped polycarbonate resin comprising a reaction mixture of a polycarbonate having hydroxy terminal groups and a compound of formula (1)

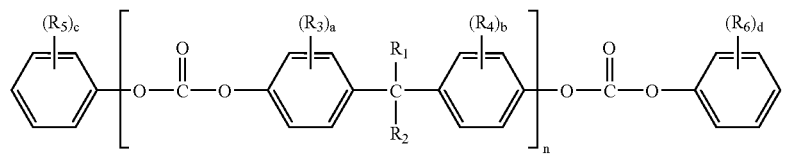

wherein n=1 to 10; each of $R_1$, $R_2$, $R_3$, $R_4$, $R_5$, and $R_6$ is independently selected from hydrogen, a halogen atom, an alkyl group having 1-18 carbon atoms, an alkoxy group having 1-18 carbon atoms, an aryl group having 6-18 carbon atoms, an araryl group having 7-18 carbon atoms, or an aralkoxy group having 7-18 carbon atoms; a and b are integers from 0 to 4, and c and d are integers from 0 to 5.

11. The end-capped resin of claim 10, wherein the amount of said compound of formula (1) is in the range of 0.5-20 moles with respect to 1 mole of said polycarbonate.

12. The end-capped resin of claim 11, wherein the final concentration of said hydroxy terminal groups of said polycarbonate resin is in the range of 0-4.7 mol % of the total terminal group of said end-capped resin.

13. The method of claim 1, wherein the final concentration of said hydroxy terminal groups of said polycarbonate resin is in the range of 0-25 mol % of the total terminal groups of said polycarbonate resin.

14. The polycarbonate resin of claim 5, wherein the final concentration of said hydroxy terminal groups of said polycarbonate resin is in the range of 0-25 mol % of the total terminal groups of said polycarbonate resin.

15. The mixed resin of claim 7, wherein the final concentration of said hydroxy terminal groups of said polycarbonate resin is in the range of 0-25 mol % of the total terminal group of said mixed resin.

16. The end-capped resin of claim 11, wherein the final concentration of said hydroxy terminal groups of said polycarbonate resin is in the range of 0-25 mol % of the total terminal group of said end-capped resin.

* * * * *